United States Patent
Honda et al.

(10) Patent No.: US 9,728,757 B2
(45) Date of Patent: Aug. 8, 2017

(54) SEPARATOR HAVING HEAT-RESISTANT INSULATING LAYER AND ELECTRIC DEVICE COMPRISING THE SAME

(75) Inventors: Takashi Honda, Kawasaki (JP); Tamaki Hirai, Yokohama (JP); Hironobu Muramatsu, Tokyo (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 299 days.

(21) Appl. No.: 14/129,394

(22) PCT Filed: Jun. 21, 2012

(86) PCT No.: PCT/JP2012/065858
§ 371 (c)(1),
(2), (4) Date: Dec. 26, 2013

(87) PCT Pub. No.: WO2013/002116
PCT Pub. Date: Jan. 3, 2013

(65) Prior Publication Data
US 2014/0113173 A1   Apr. 24, 2014

(30) Foreign Application Priority Data

Jun. 28, 2011 (JP) .................................. 2011-143348

(51) Int. Cl.
*H01M 2/16* (2006.01)
*H01G 11/52* (2013.01)

(52) U.S. Cl.
CPC .......... *H01M 2/1646* (2013.01); *H01G 11/52* (2013.01); *H01M 2/166* (2013.01);
(Continued)

(58) Field of Classification Search
USPC ...... 429/129–147, 247–255; 29/623.1–623.5
See application file for complete search history.

(56) References Cited

U.S. PATENT DOCUMENTS 5,691,077 A * 11/1997 Yu ....................... B01D 67/0027
29/623.3
8,771,859 B2 * 7/2014 Matsumoto ......... H01M 2/1626
429/144
(Continued)

FOREIGN PATENT DOCUMENTS

JP   11-080395 A    3/1999
JP   2007-194203 A  8/2007
(Continued)

OTHER PUBLICATIONS

Taiwanese Office Action dated Jan. 17, 2014, (4 pgs.).

*Primary Examiner* — Kaity Chandler
(74) *Attorney, Agent, or Firm* — Foley & Lardner LLP

(57) ABSTRACT

A separator having a heat-resistant insulating layer of the present invention includes a porous resin base layer and a heat-resistant insulating layer which is formed on one or both sides of the porous resin base layer and contains inorganic particles and a binder. The porous resin base layer contains a resin having a melting temperature of 120° C. to 200° C. The separator is configured so that the ratio of the basis weight of the heat-resistant insulating layer to the basis weight of the porous resin base layer is not less than 0.5. Accordingly, the separator having a heat-resistant insulating layer of the present invention exhibits excellent thermal shrinkage resistance while ensuring a shutdown function.

10 Claims, 5 Drawing Sheets

(52) U.S. Cl.
CPC ....... *H01M 2/1653* (2013.01); *H01M 2/1686* (2013.01); *H01M 2/162* (2013.01); *H01M 2/1666* (2013.01); *Y02E 60/13* (2013.01); *Y02T 10/7022* (2013.01)

(56) References Cited

U.S. PATENT DOCUMENTS

| | | | |
|---|---|---|---|
| 9,412,988 B2* | 8/2016 | Hong | H01M 2/1686 |
| 2006/0251966 A1* | 11/2006 | Yamakawa | H01G 9/058 |
| | | | 429/217 |
| 2007/0281206 A1 | 12/2007 | Fujikawa et al. | |
| 2009/0123832 A1* | 5/2009 | Chigiri | H01M 2/0275 |
| | | | 429/163 |
| 2009/0176147 A1 | 7/2009 | Hatanaka et al. | |
| 2010/0112432 A1 | 5/2010 | Nishida et al. | |
| 2010/0173187 A1 | 7/2010 | Nishikawa et al. | |
| 2010/0203396 A1 | 8/2010 | Murata | |
| 2010/0248001 A1 | 9/2010 | Kuze et al. | |
| 2010/0266900 A1 | 10/2010 | Makidera et al. | |
| 2011/0143183 A1 | 6/2011 | Matsumoto et al. | |
| 2012/0164514 A1* | 6/2012 | Hayakawa | H01M 2/145 |
| | | | 429/144 |
| 2012/0328929 A1 | 12/2012 | Matsumoto et al. | |

FOREIGN PATENT DOCUMENTS

| | | |
|---|---|---|
| JP | 2007-324073 A | 12/2007 |
| JP | 2009-129702 A | 6/2009 |
| JP | 2009-135092 A | 6/2009 |
| JP | 2009-272153 A | 11/2009 |
| JP | 2010-108753 A | 5/2010 |
| JP | 2010-195898 A | 9/2010 |
| JP | 2010-262939 A | 11/2010 |
| JP | 2011-023186 A | 2/2011 |
| JP | 2011-034859 A | 2/2011 |
| JP | 2011-054503 A | 3/2011 |
| JP | 2012-061791 A | 3/2012 |
| TW | 200919806 A | 5/2009 |
| WO | WO 2008/123331 A1 | 10/2008 |
| WO | WO 2008/156033 A1 | 12/2008 |
| WO | WO 2010/104127 A1 | 9/2010 |
| WO | WO 2011/033975 A1 | 3/2011 |
| WO | WO 2011/129169 A1 | 10/2011 |

* cited by examiner

SEPARATOR HAVING HEAT-RESISTANT INSULATING LAYER AND ELECTRIC DEVICE COMPRISING THE SAME

TECHNICAL FIELD

The present invention relates to a separator having a heat-resistant insulating layer. More specifically, the present invention relates to a separator having a heat-resistant insulating layer which is preferably applicable to electric devices such as lithium-ion secondary batteries and electric double-layer capacitors.

BACKGROUND ART

In recent years, hybrid electric vehicles (HEVs), electric vehicles (EV), and fuel cell vehicles are under development, some of which are already manufactured and sold. These vehicles are also called electrically-powered vehicles and are attracting attention because of growing interest in the environmental friendliness and the high fuel economy thereof. The electrically-powered vehicles require power supply devices capable of being charged and discharged. The power supply devices are electric devices including secondary batteries such as lithium-ion and nickel-hydrogen secondary batteries and electric double-layer capacitors. The lithium-ion secondary batteries, in particular, are preferably used in electrically-powered vehicles because of the high energy density thereof and the high durability against repeated charge and discharge.

For example, a lithium ion secondary battery has a configuration in which a cathode and a anode are connected through an electrolyte layer and are accommodated in a battery case. The electrolyte layer can be composed of a separator holding electrolyte solution. The separator needs to have both a function as a partition wall and a function to hold the electrolyte solution for ensuring the conduction of lithium ions between the cathode and anode. The above separator is usually composed of a microporous membrane made of an electrically insulating material.

Conventionally-developed separators have a shutdown function to stop charge/discharge reactions when the battery becomes hot during the charge/discharge reactions. The shutdown function shuts down the movement of lithium ions between the anode and cathode. To be specific, when the battery reaches a high temperature, the resin constituting the separator melts and clogs up the pores to shut down the movement of lithium ions. Accordingly, the separators which have the shutdown function are usually made of thermoplastic resin such as polyethylene (PE) or polypropylene (PP).

On the other hand, it is known that the separators made of the above thermoplastic resin have a problem with mechanical strength because of the flexibility of the materials. Under high-temperature conditions, in particular, a thermoplastic separator thermally shrinks, and the cathode and anode, which are opposed to each other with the separator interposed therebetween, could come into contact with each other, creating an internal short circuit. Accordingly, developments have been made in a technique to reduce thermal shrinkage due to heat treatment in the manufacturing process of batteries, reaction heat from the charge/discharge reactions, and the like.

For example, Patent Literature 1 discloses a porous membrane which includes a surface protecting layer containing inorganic particles of aluminum oxide or the like that is formed on at least one surface of a base made of PE or other such materials, that is, a separator. Furthermore, Examples of Patent Literature 1 describe that the separator has a low shrinkage ratio between before and after heat treatment.

CITATION LIST

Patent Literature

Patent Literature 1: Japanese Unexamined Patent Application Publication No. 11-80395

SUMMARY OF INVENTION

However, the separator described in Patent Literature 1 is intended to be mainly used in electronic devices and the like. It was revealed that the effect of reducing thermal shrinkage cannot be adequately obtained when the separator of Patent Literature 1 is applied to lithium ion secondary batteries for electrically-powered vehicles.

To apply a lithium ion secondary battery to an electrically-powered vehicle, the lithium ion secondary battery needs to have high power and high capacity. A way of achieving the high power and high capacity of a lithium ion secondary battery is by increasing the size of the same, for example. As the lithium ion secondary battery increases in size as described above, the separator increases in size. The increase in size of the separator increases the internal stress of the same under heat treatment in the manufacturing process of the battery or under increasing temperature due to reaction heat from the charge/discharge reactions. The separator therefore becomes more likely to thermally shrink. Accordingly, it has been desirable to develop a separator with the thermal shrinkage reducing effect improved.

Accordingly, an object of the present invention is to provide a separator which exhibits more excellent thermal shrinkage resistance while ensuring the shutdown function.

A separator having a heat-resistant insulating layer according to an aspect of the present invention includes: a porous resin base layer; and a heat-resistant insulating layer which is provided on at least one side of the porous resin base layer and contains inorganic particles and a binder. The porous resin base layer contains a resin having a melting temperature of 120 to 200° C., and a ratio of basis weight of the heat-resistant insulating layer to basis weight of the porous resin base layer is not less than 0.5. Moreover, an electric device of the present invention includes the separator having a heat-resistant insulating layer of the present invention.

DESCRIPTION OF EMBODIMENTS

Hereinafter, a description is given of a separator having a heat-resistant insulating layer and an electric device of the present invention in detail with reference to the drawings. In this specification, "%" represents a mass percentage if not otherwise specified. Moreover, the dimensional proportions of the drawings are exaggerated for convenience of explanation, and some are different from the actual proportions.
[Configuration of Separator Having Heat-Resistant Insulating Layer]

A description is given of a separator having a heat-resistant insulating layer according to an embodiment of the present invention in detail.

Figure 1:
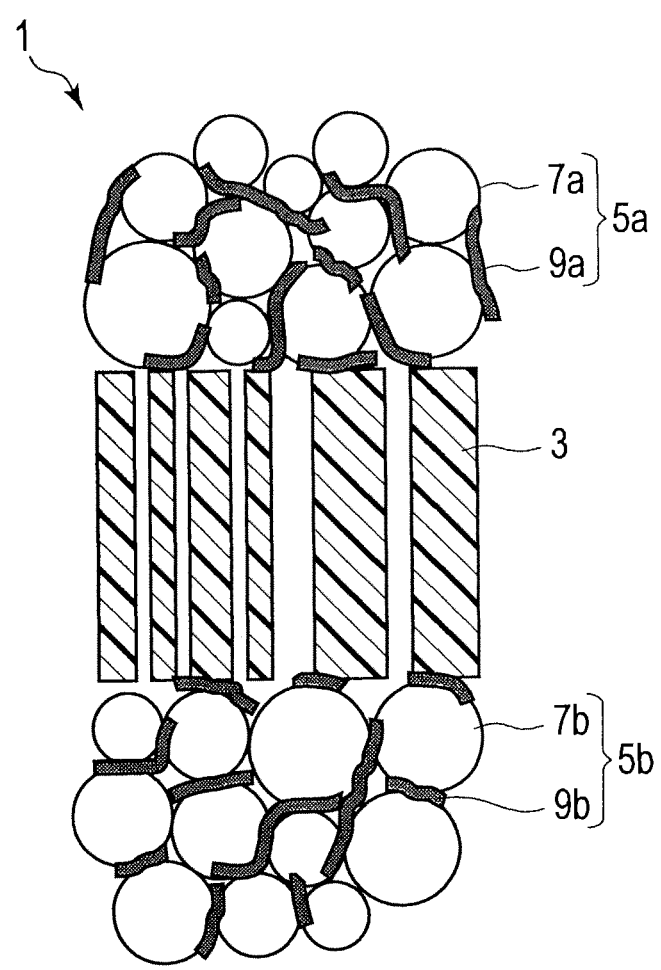
FIG. 1 is a schematic cross-sectional view schematically illustrating a separator having a heat-resistant insulating layer according to an embodiment of the present invention.

The separator having a heat-resistant insulating layer according to the embodiment of the present invention is schematically illustrated as a schematic cross-sectional view in FIG. 1. As illustrated in FIG. 1, in a separator 1 having a heat-resistant insulating layer according to the embodiment, heat-resistant insulating layers 5a and 5b are respectively formed on upper and lower surfaces of a porous resin base layer 3 made of polyethylene. The porous resin base layer 3 is composed of a microporous membrane which has a porosity of 65% and is made of polyethylene having a melting temperature of 130° C. On the other hand, the heat-resistant insulating layers 5a and 5b contain inorganic particles 7a and 7b made of alumina and binders 9a and 9b made of carboxymethylcellulose, respectively. The inorganic particles are bonded to the porous resin base layer 3 or to adjacent inorganic particles through the binder. As illustrated in FIG. 1, the porous resin base layer 3 includes voids, and there are gaps among the inorganic particles. Accordingly, the separator 1 having a heat-resistant insulating layer functions as a separator having ion conductivity as a whole.

In the separator 1 having a heat-resistant insulating layer of FIG. 1, the value of the basis weight ratio of the basis weight of the heat-resistant insulating layers 5a and 5b (which is calculated as a total value of the both insulating layers 5a and 5b) to the basis weight of the porous resin base layer 3 is 3.06. Herein, the basis weight refers to a weight (g) per one meter square, and the unit thereof is [g/m²]. The basis weight ratio obtained by dividing the value of the basis weight of the heat-insulating layers by the value of the basis weight of the porous resin base layer is a dimensionless number not having a unit of measurement.

The separator 1 having a heat-resistant insulating layer of FIG. 1 has a basis weight ratio of the aforementioned value and thereby exhibits considerably excellent thermal shrinkage resistance while ensuring the shutdown function.

Hereinafter, each of the components of the separator having a heat-resistant insulating layer of the embodiment is described in detail.
(Porous Resin Base Layer)

The porous resin base layer is configured to give the shutdown function to the separator having a heat-resistant insulating layer. Accordingly, the porous resin base layer contains a resin having a melting temperature of 120° C. to 200° C.

The material used in the porous resin base layer is not particularly limited and only needs to have a melting temperature in the aforementioned range. The material is polyethylene (PE), polypropylene (PP), or a copolymer (ethylene-propylene copolymer) obtained by copolymerization of monomer units of ethylene and propylene, for example. Moreover, the material may be a copolymer obtained by copolymerization of ethylene or propylene and a monomer other than ethylene and propylene. Furthermore, the material of the porous resin base layer may contain a resin or a thermosetting resin having a melting temperature exceeding 200° C. as long as the material contains a resin having a melting temperature of 120 to 200° C. Examples thereof are polystyrene (PS), polyvinyl acetate (PVAc), polyethylene terephthalate (PET), polyvinylidene difluoride (PVDF), polytetrafluoroethylene (PTFE), polysulfone (PSF), polyethersulfone (PES), polyetheretherketone (PEEK), polyimide (PI), polyamide-imide (PAI), phenol resin (PF), epoxy resin (EP), melamine resin (MF), urea resin (UF), alkyd resin, and polyurethane (PUR). Herein, the content of the resin having a melting temperature of 120° C. to 200° C. in the entire porous resin base layer is preferably not less than 50 mass %, more preferably not less than 70%, still more preferably not less than 90%, still more preferably not less than 95%, and most preferably equal to 100%. Moreover, the porous resin base layer may be formed by laminating the aforementioned materials. An example of such a laminate-type porous resin base layer is a layer having a three-layer structure of PP/PE/PP. With the above porous resin base layer, shutdown can occur when the battery temperature reaches 130° C., which is the melting point of PE. Even in the case where the battery temperature continues to increase after the shutdown, meltdown does not occur until the battery temperature reaches 170° C., which is the melting point of PP. Accordingly, it is possible to prevent the anode and cathode from being short circuited over the entire interface.

The form of the porous resin base layer is not particularly limited and can be at least one selected from a group consisting of woven fabric, non-woven fabric, and microporous membrane. Herein, in order to ensure the high ion conductivity of the porous resin base layer, it is preferable that the porous resin base layer has a highly porous structure. It is therefore preferable that the porous resin base layer has a form of microporous membrane in terms of increasing the battery performance. Moreover, the porosity of the porous resin base layer is preferably 40% to 85%. When the porosity thereof is not less than 40%, the porous resin base layer can be provided with adequate ion conductivity. On the other hand, when the porosity is not more than 85%, the porous resin base layer can keep adequate strength.

The aforementioned porous resin base layer can be manufactured by publicly-known methods. The methods include a stretching pore formation method and a phase separation method for manufacturing microporous membrane and an electrospinning for manufacturing non-woven fabric, for example.
(Heat-Resistant Insulating Layer)

Each heat-resistant insulating layer is a ceramic layer containing (1) inorganic particles and (2) a binder. The provision of the heat-resistant insulating layer can reduce the internal stress of the separator which increases as the battery temperature increases. Accordingly, the separator exhibits excellent thermal shrinkage resistance. Moreover, the provision of the heat-resistant insulating layer increases the mechanical strength of the separator having a heat-resistant insulating layer, so that the separator is less likely to be broken. Furthermore, the high thermal shrinkage reducing effect and high mechanical strength reduce curling of the separator in the manufacturing process of electric devices.

(1) Inorganic Particle

The inorganic particles are a constituent element of the heat-resistant insulating layer and provide mechanical strength and thermal shrinkage reducing effect for the heat-resistant insulating layer.

The material used for the inorganic particles is not particularly limited and can include publicly-known materials. The material used for the inorganic particles is an oxide, a hydroxide, a nitride of silicon, aluminum, zirconium, and titanium, or a complex thereof, for example. Examples of the oxides of silicon, aluminum, zirconium, and titanium can be silica ($SiO_2$), alumina ($Al_2O_3$), zirconia ($ZrO_2$), and titania ($TiO_2$). The aforementioned materials for the inorganic particles can be used solely or in combination of two or more. Among those materials, silica or alumina is preferred from the cost perspective.

The inorganic particles have a specific density. The density of zirconia is about 5.7 $g/cm^3$; alumina, about 4.0 $g/cm^3$; titania, about 3.9 to 4.3 $g/cm^3$; and silica, about 2.2 $g/cm^3$, for example. The necessary amount of inorganic particles depends on the type of the included inorganic particles. When the density of inorganic particles becomes higher while the weight is constant, there is a tendency for the thermal shrinkage reducing effect to improve. Accordingly, zirconia is preferably used as the inorganic particles in another embodiment. The particle size of the inorganic particles is not particularly limited and can be properly adjusted.

(2) Binder

The binder is a constituent element of the heat-resistant insulating layer and has a function to bond the inorganic particles to adjacent inorganic particles and to the porous resin base layer.

The binder contributes to the adhesion between the adjacent inorganic particles and the adhesion between the porous resin base layer and the heat-resistant insulating layer. In such a manner, the binder can stably form the heat-resistant insulating layer and increase the peel strength between the porous resin base layer and the heat-resistant insulating layer. The binder is therefore an essential constituent element in the heat-resistant insulating layer. Preferably, the content of the binder is 2 to 20 mass % with respect to the heat-resistant insulating layer of 100 mass %. When the content of the binder is not less than 2 mass %, the separator having a heat-resistant insulating layer has high peel strength and is highly resistant to vibration. On the other hand, when the content of the binder is not more than 20 mass %, the adhesion can be maintained to a proper degree while the binder is less likely to inhibit the ion conduction.

The material used for the binder is not particularly limited and can be a publicly known material. Examples thereof include carboxymethylcellulose (CMC), polyacrylonitrile, cellulose, ethylene-vinyl acetate copolymer, polyvinyl chloride, styrene-butadiene rubber (SBR), isoprene rubber, butadiene rubber, polyvinylidene difluoride (PVDF), polytetrafluoroethylene (PTFE), polyvinyl fluoride (PVF), and methyl acrylate. The above substances can be used solely or in combination of two or more. Among these binders, carboxymethyl cellulose (CMC), methyl acrylate, and polyvinylidene difluoride (PVDF) are preferred.

The separator having a heat-resistant insulating layer of this embodiment takes a role of insulating conduction of electrons between the cathode and anode. In terms of improving the battery performance, it is preferable that the total thickness of the separator is small. Specifically, the total thickness of the separator is preferably 10 to 50 μm and more preferably 15 to 30 μm. When the total thickness is not less than 10 μm, the strength of the separator is ensured. On the other hand, when the total thickness is not more than 50 μm, the battery can be made compact.

The separator having a heat-resistant insulating layer of this embodiment is configured so that the basis weight ratio of the heat-resistant insulating layer to the porous resin base layers is in a predetermined range. Specifically, the basis weight ratio needs to be not less than 0.5, preferably not less than 0.8, and more preferably not less than 1.3. By setting the basis weight ratio in the aforementioned range, the thermal shrinkage of the separator can be effectively reduced. The reason thereof is that the internal stress of the porous resin base layer, which increases as the temperature increases, can be adequately reduced by the heat-resistant insulating layer. On the other hand, the upper limit of the basis weight ratio is not particularly limited but is preferably not more than 2.0 in the light of the entire weight of the separator having a heat-resistant insulating layer. The reason thereof is as follows. When the basis weight ratio is not more than 2.0, the thermal shrinkage reducing effect of the separator increases as the weight ratio increases. However, when the basis weight ratio is more than 2.0, the thermal shrinkage reducing effect of the separator hardly increases even if the basis weight ratio further increases.

The separator having a heat-resistant insulating layer of the embodiment is characterized by exhibiting excellent thermal shrinkage resistance. Accordingly, the performance of the separator can be evaluated by measuring the thermal shrinkage ratio of the separator. The thermal shrinkage ratio of the separator having a heat-resistant insulating layer of the embodiment, which depends on the intended use of the separator having a heat-resistant insulating layer, is preferably not more than 35%, more preferably not more than 10%, and most preferably not more than 5%. The thermal shrinkage ratio is measured by a method described in Examples.

Moreover, it is preferable that the separator having a heat-resistant insulating layer of the embodiment has high peel strength between the porous resin base layer and each heat-resistant insulating layer. Specifically, the peel strength is preferably not less than 0.1 mN/mm and more preferably not less than 2.0 mN/mm. Increasing the peel strength increases the vibration resistance of the separator having a heat-resistant insulating layer. Accordingly, the separator with a peel strength of not less than 0.1 mN/mm can be preferably included in electrical devices of electrically-powered vehicles. Moreover, when the peel strength is increased, the stress reducing operation of the heat-resistant insulating layer can be effectively transmitted to the porous resin base layer, and the thermal shrinkage of the separator can be further reduced. In other words, when the peel strength is increased, the basis weight of the heat-resistant insulating layer necessary for the separator to exhibit a desired thermal shrinkage reducing effect can be reduced. Accordingly, the weight of the separator having a heat-resistant insulating layer can be reduced. On the other hand, the upper limit of the peel strength is not particularly limited. However, the peel strength is preferably not more than 10 mN/mm so that the binder is not added excessively. The peel strength is measured by a method described in Examples.

Applications of the separator having a heat-resistant insulating layer of the embodiment are electric devices such as lithium ion secondary batteries, for example. For applying a lithium ion secondary battery to electrically-powered vehicles, the battery needs to have high power and high capacity. Accordingly, the lithium ion secondary battery itself is formed into a laminate structure to increase in size.

This can increase the weight of the battery itself and the weight of the entire electrically powered vehicle. However, it is possible to provide a lightweight electrically-powered vehicle by using the separator having a heat-resistant insulating layer of this embodiment with the weight of the aforementioned heat-resistant insulating layer reduced.

[Manufacturing Method of Separator Having Heat-Resistant Insulating Layer]

The separator having a heat-resistant insulating layer is manufactured by a publicly-known manufacturing method, which is not particularly limited, as long as the melting temperature and the basis weight ratio satisfy predetermined values. In this process, the heat-resistant insulating layer may be formed on only one surface of the porous resin base layer or both surfaces thereof. In the case of forming the heat-resistant insulating layer on each surface, the basis weight ratio needs to be set to 0.5 or more where the basis weight of the heat-resistant insulating layers is set to the sum of the basis weights of the individual heat-resistant insulating layers formed on both surfaces. The separator may be configured so that another layer is interposed between the porous resin base layer and each heat-resistant insulating layer as long as the separator can provide a desired thermal shrinkage reducing effect. Such a configuration is included in the technical scope of the present invention. In such a case where the separator further includes a third layer, the total thickness is a thickness including the thickness of the third layer.

A specific example of the method of manufacturing the separator having a heat-resistant insulating layer is applying a solution containing the inorganic particles and binder dispersed in a solvent to a porous resin base layer and then removing the solvent.

The solvent used in the process, which is not particularly limited, is N-methyl-2-pyrollidone (NMP), dimethylformamide, dimethylacetamide, methylformamide, cyclohexane, hexane, water, or the like. In the case where the binder is polyvinylidene difluoride (PVDF), it is preferable that the solvent is NMP. The temperature for removing the solvent is not particularly limited and can be properly set depending on the used solvent. For example, in the case of using water as the solvent, the temperature for removing the solvent can be set to 50° C. to 70° C., and in the case of using NMP as the solvent, the temperature can be set to 70° C. to 90° C. The solvent may be removed under reduced pressure if necessary. Moreover, the solvent may be partially left instead of being completely removed.

The basis weight ratio can vary depending on the materials of the porous resin base layer and heat-resistant insulating layers. Specifically, the basis weight ratio can be affected by the porosity of the porous resin base layer, the density and particle size of the inorganic particles, the total thickness of the separator having a heat-resistant insulating layer, the content of the binder, and the like. Accordingly, it is preferable that the separator having a heat-resistant insulating layer is manufactured taking the aforementioned factors into consideration.

[Electric Device (Lithium-Ion Secondary Battery)]

As described above, the separator having a heat-resistant insulating layer of the embodiment has a basis weight ratio of a predetermined value and thereby exhibits excellent thermal shrinkage resistance while ensuring the shutdown function. The thus-configured separator having a heat-resistant insulating layer is preferably reduced in weight as much as possible. Moreover, it is preferable that the separator having a heat-resistant insulating layer is resistant to vibration. The separator having a heat-resistant insulating layer can be preferably used in lithium ion secondary batteries since the separator has the aforementioned properties. The separator having a heat-resistant insulating layer can be also preferably used in electric devices including other types of secondary batteries, such as nickel-hydrogen secondary batteries, and electric double-layer capacitors.

Figure 2:
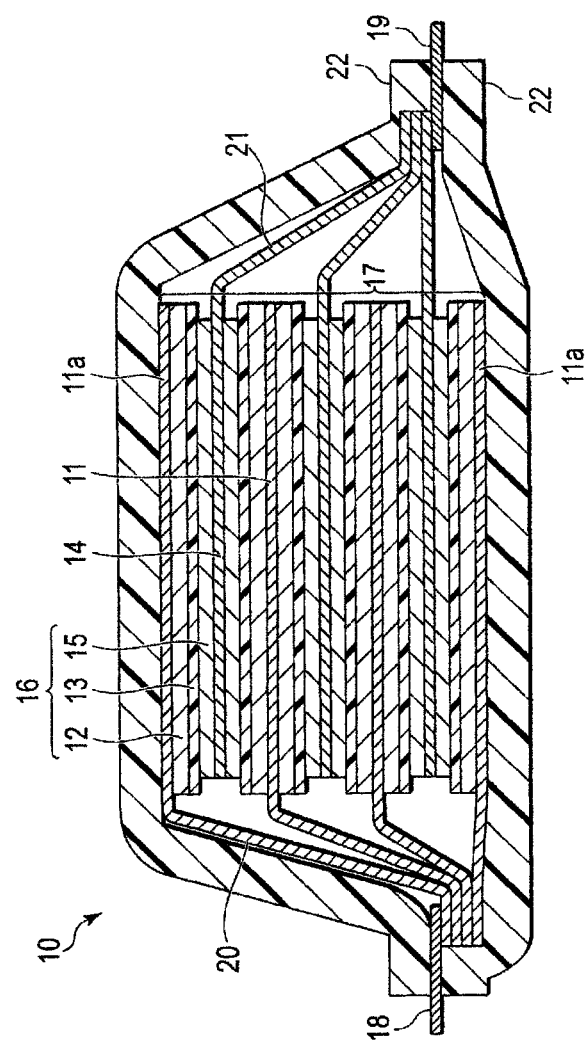
FIG. 2 is a schematic cross-sectional view schematically illustrating an entire structure of a laminate-type (not bipolar-type) lithium ion secondary battery according to an embodiment of the present invention.

FIG. 2 illustrates an entire structure of a laminate-type (not bipolar type) lithium ion secondary battery 10 as an example of electric devices to which the separator having a heat-resistant insulating layer of the embodiment is applied. The lithium ion secondary battery 10 includes a structure in which a substantially rectangular power generating element 17 is sealed between laminate films 22 as a battery package. In the power generating element 17, charge/discharge reactions actually proceed. To be specific, the power generating element 17 is accommodated and sealed by polymer-metal composite laminate film as the battery package which is thermally-fused and bonded in the entire periphery thereof.

The power generating element 17 has a configuration in which anodes, electrolyte layers 13, and cathodes are stacked on one another. Each anode includes an anode current collector 11 and anode active material layers 12 formed on both surfaces of the collector 11. Each cathode includes a cathode current collector 14 and cathode active material layers 15 formed on both surfaces of the collector 14. Specifically, the anodes, electrolyte layers 13, and cathodes are stacked on one another in this order in such a manner that each of the anode active material layers 12 is opposed to the cathode active material layer 15 adjacent thereto with the corresponding electrolyte layer 13 interposed therebetween. Each of the outermost anode current collectors 11a which are located in the outermost layers of the power generating element 17 is provided with the anode active material layer 12 on only one side thereof. In FIG. 2, the anodes and cathodes may be substituted with each other so that the outermost cathode current collectors are located in both outermost layers of the power generating element 17 and are each provided with a cathode active material layer on only one side thereof.

The adjacent anode, electrolyte layer 13, and cathode thus constitute one unit cell layer 16. In other words, the lithium ion secondary battery 10 of the embodiment has a configuration in which plural unit cell layers 16 are stacked to be electrically connected in parallel. Each unit cell 16 may be provided with a not-shown seal member (an insulating layer) therearound, which isolates the adjacent cathode and anode current collectors 11 and 14 from each other.

The anode current collectors 11 and cathode current collectors 14 are respectively attached to an anode current collector plate 18 and a cathode current collector plate 19 which are electrically connected to respective electrodes (positive and negative electrodes). The collector plates 18 and 19 are sandwiched by the laminate films 22 and are extended out of the laminate films 22. The anode and cathode current collectors 11 and 14 of the anodes and cathodes may be attached to the anode and cathode current collector plates 18 and 19 through anode and cathode terminal leads 20 and 21 by ultrasonic welding or resistance welding. The configuration is illustrated in FIG. 2. However, the anode current collector plate 18 may be composed of extensions of the anode current collectors 11 and extended out of the laminate films 22. In a similar manner, the cathode current collector plate 19 may be composed of extensions of the cathode current collectors 14 and extended out of the laminate films 22.

In FIG. 2, the separator having a heat-resistant insulating layer constitutes each electrolyte layer 13 together with electrolyte solution. The electrolyte solution held by the electrolyte layer 13 preferably contains lithium ions and are excellent in lithium ion conduction. By including the heat-resistant insulating layer, the laminate-type lithium ion secondary battery illustrated in FIG. 2 can be a safe separator having a heat-resistant insulating layer which exhibits excellent thermal shrinkage resistance while ensuring the shutdown function. Moreover, the separator having a heat-resistant insulating layer with a suitable peel strength can provide a vibration-resistant lithium ion secondary battery.

EXAMPLES

Hereinafter, the present invention is described in detail based on Examples. The present invention is not limited to those Examples.

Example 1

A polyethylene (PE) microporous membrane having a thickness of 10 μm and a porosity of 65% and an aqueous solution containing 95 mass % alumina ($Al_2O_3$) particles and 5 mass % carboxymethylcellulose (CMC) evenly dispersed in water were prepared. The prepared aqueous solution was applied to the both surfaces of the microporous membrane using a gravure coater. Then, water is removed at 60° C. In such a manner, a separator having a heat-resistant insulating layer that has a total thickness of 24 μm and includes a 7.0 μm heat-resistant insulating layer formed on each side of the PE microporous membrane was produced.

Example 2

A separator having a heat-resistant insulating layer was produced by the same method as that of Example 1 except the following. The PE microporous membrane had a thickness of 12.5 μm, and the inorganic particles were titania ($TiO_2$) particles. The separator had a total thickness of 24.5 μm and included a 6.0 μm heat-resistant insulating layer formed on each surface of the PE microporous membrane.

Example 3

A separator having a heat-resistant insulating layer was produced by the same method as that of Example 2 except using alumina particles as the inorganic particles.

Example 4

A separator having a heat-resistant insulating layer was produced by the same method as that of Example 2 except using magnesium hydroxide ($Mg(OH)_2$) particles as the inorganic particles.

Example 5

A separator having a heat-resistant insulating layer was produced by the same method as that of Example 2 except using aluminum hydroxide ($Al(OH)_3$) particles as the inorganic particles.

Example 6

A separator having a heat-resistant insulating layer was produced by the same method as that of Example 1 except the following. The porous resin base was a PE microporous membrane with a thickness of 14 μm and a porosity of 60%.

The heat-resistant insulating layer formed on each surface of the PE microporous membrane had a thickness of 5.5 μm, and the separator had a total thickness of 25 μm.

Example 7

A separator having a heat-resistant insulating layer was produced by the same method as that of Example 6 except that the PE microporous membrane had a porosity of 55%.

Example 8

A separator having a heat-resistant insulating layer was produced by the same method as that of Example 7 except the following. The PE microporous membrane had a thickness of 16 μm, and the inorganic particles were zirconia ($ZrO_2$) particles. The heat-resistant insulating layer formed on each surface of the PE microporous membrane was 5.5 μm.

Example 9

A separator having a heat-resistant insulating layer was produced by the same method as that of Example 7 except that the porous resin base was a polypropylene (PP) microporous membrane having a thickness of 14 μm and a porosity of 55%.

Example 10

A separator having a heat-resistant insulating layer was produced by the same method as that of Example 7 except using silica ($SiO_2$) particles as the inorganic particles.

Example 11

A separator having a heat-resistant insulating layer was produced by the same method as that of Example 7 except using titania particles as the inorganic particles.

Example 12

A separator having a heat-resistant insulating layer was produced by the same method as that of Example 8 except using magnesium hydroxide particles as the inorganic particles.

Example 13

A separator having a heat-resistant insulating layer was produced by the same method as that of Example 8 except using alumina particles as the inorganic particles.

Example 14

A separator having a heat-resistant insulating layer was produced by the same method as that of Example 7 except the following. The PE microporous membrane had a thickness of 15 μm, and the heat-resistant insulating layer formed on each surface of the PE microporous membrane had a thickness of 5.0 μm.

Example 15

A separator having a heat-resistant insulating layer was produced by the same method as that of Example 7 except the following. The thickness of the PE microporous membrane was 16 μm, and the inorganic particles were zinc oxide (ZnO$_2$) particles. A heat-resistant insulating layer having a thickness of 4.0 μm was formed on each surface of the PE microporous membrane, and the separator had a total thickness of 24 μmm.

Example 16

A separator having a heat-resistant insulating layer was produced by the same method as that of Example 7 except the following. The thickness of the PE microporous membrane was 18 μm. The heat-resistant insulating layer formed on each side of the PE microporous membrane had a thickness of 4.0 μm. The separator had a total thickness of 26 μm.

Example 17

A separator having a heat-resistant insulating layer was produced by the same method as that of Example 15 except the following. The inorganic particles were zinc oxide particles. The heat-resistant insulating layer formed on each surface of the PE microporous membrane had a thickness of 3.5 μm, and the separator had a total thickness of 25 μm.

Comparative Example 1

A separator having a heat-resistant insulating layer was produced by the same method as that of Example 1 except the following. The porous resin base layer was composed of a polyethylene terephthalate (PET) non-woven fabric having a thickness of 20 μm and a porosity of 85%, and the separator had a total thickness of 34 μm.

Comparative Example 2

A separator having a heat-resistant insulating layer was produced by the same method as that of Example 14 except the following. The porous resin base was composed of a polyvinylidene difluoride (PVDF) microporous membrane having a thickness of 15 μm and a porosity of 55%.

Comparative Example 3

A separator having a heat-resistant insulating layer was produced by the same method as that of Example 15 except the following. The PE microporous membrane had a thickness of 17 μm. The heat-resistant insulating layer formed on each side of the PE microporous membrane had a thickness of 4.5 μm. The separator had a total thickness of 26 μm.

Comparative Example 4

A separator which was composed of only a PP microporous membrane having a thickness of 25 μm and a porosity of 55% and had a total thickness of 25 μm was produced.

Comparative Example 5

A separator which was composed of only a PE microporous membrane having a thickness of 25 μm and a porosity of 55% and had a total thickness of 25 μm was produced.

Example 18

A separator having a heat-resistant insulating layer was produced by the method of Example 7.

Example 19

A PE microporous membrane having a thickness of 15 μm and a porosity of 55% and a solution containing 95 mass % alumina particles and 5 mass % methyl acrylate evenly dispersed in N-methyl-2-pyrrolidone (NMP) were prepared. The prepared solution was applied to both surfaces of the microporous membrane using a gravure coater. Then, NMP was removed at 80° C. In such a manner, a separator having a heat-resistant insulating layer including a 5.0 μm heat-resistant insulating layer formed on each surface of the PE microporous membrane was produced. The separator had a total thickness of 25 μm.

Example 20

A separator having a heat-resistant insulating layer was produced by the same method as that of Example 19 except using PVDF as the binder.

Example 21

A separator having a heat-resistant insulating layer was produced by the same method as that of Example 18 except the following. The PE microporous membrane had a thickness of 15 m, and the heat-resistant insulating layer formed on each surface of the PE microporous membrane had a thickness of 5.0 μm. Moreover, the content of CMC was 3 mass %, and the content of alumina was 97 mass %.

Example 22

A separator having a heat-resistant insulating layer was produced by the same method as that of Example 21 except using methyl acrylate as the binder.

Example 23

A separator having a heat-resistant insulating layer was produced by the same method as that of Example 21 except using PVDF as the binder.

Example 24

A separator having a heat-resistant insulating layer was produced by the same method as that of Example 21 except that the contents of CMC and alumina were 2.5 mass % and 97.5 mass %, respectively.

Example 25

A separator having a heat-resistant insulating layer was produced by the same method as that of Example 21 except that the contents of CMC and alumina were 2.0 mass % and 98 mass %, respectively.

Example 26

A separator having a heat-resistant insulating layer was produced by the same method as that of Example 21 except that the contents of CMC and alumina were 1.0 mass % and 99 mass %, respectively.

Example 27

A separator having a heat-resistant insulating layer was produced by the same method as that of Example 21 except that the contents of CMC and alumina were 0.5 mass % and 99.5 mass %, respectively.

[Evaluation of Separator]

The manufactured separators were subjected to the following tests.

<Impedance Heating Test: Evaluation of Shutdown Function>

Prepared was 1 M electrolyte solution which contains lithium salt $LiPF_6$ dissolved in a solvent obtained by mixing ethylene carbonate (EC) and diethyl carbonate (DEC) at a ratio of ⅔ in volume. Then, in a globe box, the electrolyte solution was impregnated into the separator of each Example, which was cut into a φ30 piece. The φ30 separators were sandwiched between two metallic plates (made of SUS) to form a coin cell. The obtained coin cell was heated from the room temperature to 200° C. at 1° C./min as the internal impedance was measured. It was determined that the separator whose internal impedance increased tenfold or more before and after the increase in temperature had the shutdown function.

<Thermal Shrinkage Test: Evaluation of Thermal Shrinkage Resistance>

Each separator was cut into 20 cm by 20 cm, and the dimension thereof in the MD direction was measured. The measurement result thereof was set to an initial dimension. Subsequently, the separator was left in a constant-temperature bath at 150° C. An hour later, the dimension thereof in the MD direction was measured again. The measurement result was considered as a dimension of the separator after thermal shrinkage. The thermal shrinkage ratio was calculated by the following equation based on the aforementioned measurement results.

Thermal shrinkage Ratio=(Initial Dimension−Dimension after Thermal shrinkage)/Initial Dimension×100  [Equation 1]

<180-Degree Peeling Test: Evaluation of Peel Strength>

One side of the heat-resistant insulating layer was reinforced by cellophane tape (by Nichiban Co., Ltd.). The separator was then cut to a width of 10 mm and was attached and fixed to a metallic base with double-faced tape. The cellophane tape was then peeled off by 10 mm. The test piece was attached to a measurement machine and was measured in terms of peel strength under the conditions of a tensile speed of 100 mm/min and a peel distance of 80 mm. The measurement machine was STA-1150 made by ORIENTEC coop.

[Evaluation Results]

The compositions of the separators produced in Examples and Comparative Examples and the results of the tests are shown in Tables 1 and 2 below.

TABLE 1

| | POROUS RESIN BASE LAYER | | | | | HEAT-RESISTANT INSULATING LAYER THICKNESS | INORGANIC PARTICLE | CMC (MASS %) | SEPARATOR TOTAL THICKNESS (μm) | MD THERMAL SHRINKAGE RATIO (%) | SHUTDOWN |
|---|---|---|---|---|---|---|---|---|---|---|---|
| | BASIS WEIGHT RATIO | MATERIAL | STRUCTURE | THICKNESS (mm) | POROSITY (%) | | | | | | |
| Example 1 | 3.06 | PE | microporous | 10 | 65 | 7 | ALUMINA | 5 | 24 | 0.89 | SHUT DOWN |
| Example 2 | 2.12 | PE | microporous | 12.5 | 65 | 6 | TITANIA | 5 | 24.5 | 0.88 | SHUT DOWN |
| Example 3 | 2.06 | PE | microporous | 12.5 | 65 | 6 | ALUMINA | 5 | 24.5 | 0.92 | SHUT DOWN |
| Example 4 | 1.97 | PE | microporous | 12.5 | 55 | 6 | MAGNESIUM HYDROXIDE | 5 | 24.5 | 1.45 | SHUT DOWN |
| Example 5 | 1.95 | PE | microporous | 12.5 | 55 | 6 | ALUMINA | 5 | 24.5 | 1.43 | SHUT DOWN |
| Example 6 | 1.7 | PE | microporous | 14 | 60 | 5.5 | ALUMINA | 5 | 25 | 1.83 | SHUT DOWN |
| Example 7 | 1.32 | PE | microporous | 14 | 55 | 5.5 | ALUMINA | 5 | 25 | 1.92 | SHUT DOWN |
| Example 8 | 1.3 | PE | microporous | 16 | 55 | 4.5 | ZIRCONIA | 5 | 25 | 0.97 | SHUT DOWN |
| Example 9 | 1.3 | PP | microporous | 14 | 55 | 5.5 | ALUMINA | 5 | 25 | 1.85 | SHUT DOWN |
| Example 10 | 1.3 | PE | microporous | 14 | 55 | 5.5 | SILICA | 5 | 25 | 2.56 | SHUT DOWN |
| Example 11 | 1.3 | PE | microporous | 14 | 55 | 5.5 | TITANIA | 5 | 25 | 2.88 | SHUT DOWN |
| Example 12 | 1.21 | PE | microporous | 16 | 55 | 4.5 | MAGNESIUM HYDROXIDE | 5 | 25 | 15.4 | SHUT DOWN |
| Example 13 | 1.21 | PE | microporous | 16 | 55 | 4.5 | ALUMINA | 5 | 25 | 14.9 | SHUT DOWN |
| Example 14 | 1.2 | PE | microporous | 15 | 55 | 5 | ALUMINA | 5 | 25 | 10.73 | SHUT DOWN |
| Example 15 | 0.82 | PE | microporous | 16 | 55 | 4 | ZINC OXIDE | 5 | 24 | 11.55 | SHUT DOWN |
| Example 16 | 0.73 | PE | microporous | 18 | 55 | 4 | ALUMINA | 5 | 26 | 29 | SHUT DOWN |
| Example 17 | 0.51 | PE | microporous | 18 | 55 | 3.5 | ZINC OXIDE | 5 | 25 | 27.3 | SHUT DOWN |
| Comparative Example 1 | 1.2 | PET | Non-woven fabric | 20 | 85 | 7 | ALUMINA | 5 | 34 | 1.32 | NOT SHUT DOWN |
| Comparative Example 2 | 1.2 | PVDF | microporous | 15 | 55 | 5 | ALUMINA | 5 | 25 | 5.91 | NOT SHUT DOWN |

TABLE 1-continued

| | POROUS RESIN BASE LAYER | | | | | HEAT-RESISTANT INSULATING LAYER THICKNESS | INORGANIC PARTICLE | CMC (MASS %) | SEPARATOR TOTAL THICKNESS (µm) | MD THERMAL SHRINKAGE RATIO (%) | SHUTDOWN |
|---|---|---|---|---|---|---|---|---|---|---|---|
| | BASIS WEIGHT RATIO | MATERIAL | STRUCTURE | THICKNESS (mm) | POROSITY (%) | | | | | | |
| Comparative Example 3 | 0.45 | PE | microporous | 17 | 55 | 4.5 | ZINC OXIDE | 5 | 26 | 39.1 | SHUT DOWN |
| Comparative Example 4 | 0 | PP | microporous | 25 | 55 | — | | | 25 | 51.2 | SHUT DOWN |
| Comparative Example 5 | 0 | PE | microporous | 25 | 55 | — | | | 25 | — | SHUT DOWN |

In Table 1, the results of Examples 1 to 17 revealed that the separators that had a basis weight ratio of not less than 0.5 and included the porous resin base layer made of PE or PP had the shutdown function and exhibited excellent thermal shrinkage reducing effect. On the other hand, according to the results of Comparative Examples 1 and 2, the separators had a basis weight ratio of 1.2 and thereby included excellent thermal shrinkage reducing effect. However, shut down did not occur because the porous resin base layers were made of only PET or PVDF. Moreover, according to the results of Comparative Example 3, the separator had the shutdown function because the porous resin base layer was made of only PE. However, the thermal shrinkage ratio of the separator of Comparative Example 3 was high because the weight ratio was less than 0.5.

Figure 3:
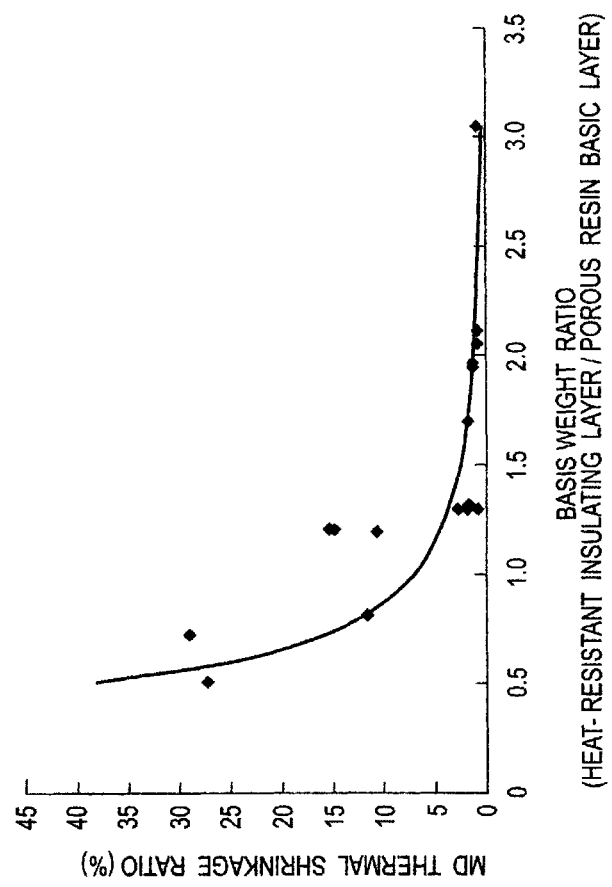
FIG. 3 is a graph showing the relationship between thermal shrinkage ratio and basis weight ratio of the heat-resistant insulating layer to porous resin base layer in separators having a heat-resistant insulating layer of Examples 1 to 17.

Moreover, in the graph showing the relationship between the basis weight ratio and MD thermal shrinkage ratio in FIG. 3, the MD thermal shrinkage ratio was about 35% when the basis weight ratio was 0.5, about 10% when the basis weight ratio was 0.8, and about 5% when the basis weight ratio was 1.3. This reveals that the MD thermal shrinkage ratio lowered as the basis weight ratio increased. The reason thereof was considered to be because the effect of reducing the internal stress of the separator, which increased as the temperature increased, was increased as the basis weight ratio increased. On the other hand, when the basis weight ratio was more than 2.0, the MD thermal shrinkage ratio was substantially constant. It was revealed that the separators did not always exhibit the thermal shrinkage reducing effect in proportion to the increase in the basis weight ratio. Accordingly, it is understood that the basis weight ratio is preferably set to not more than 2.0 in terms of reducing the weight of the separator having a heat-resistant insulating layer.

The results of Examples 8 to 13 revealed that the MD thermal shrinkage ratio varied depending on the type of the contained inorganic particles even when the basis weight ratio was constant. Specifically, zirconia particles, which have the highest density, reduced the thermal shrinkage of the separator most. This result revealed that there is a tendency for the heat-shrinkage reducing effect to improve as the density of the inorganic particles increases.

TABLE 2

| | BASIS WEIGHT RATIO | THICKNESS OF POROUS RESIN BASE LAYER (µm) | THICKNESS OF HEAT-RESISTANT INSULATING LAYER (µm) | INORGANIC PARTICLE MASS % | BINDER TYPE | BINDER MASS % | TOTAL THICKNESS OF SEPARATOR (µm) | MD THERMAL SHRINKAGE RATIO (%) | PEEL STRENGTH (mN/mm) |
|---|---|---|---|---|---|---|---|---|---|
| Example 18 | 1.32 | 14 | 5.5 | 95 | CMC | 5 | 25 | 1.92 | 11.8 |
| Example 19 | 1.3 | 15 | 5 | 95 | METHYL ACRYLATE | 5 | 25 | 1.35 | 13.1 |
| Example 20 | 1.3 | 15 | 5 | 95 | PVDF | 5 | 25 | 1.21 | 14.2 |
| Example 21 | 1.3 | 15 | 5 | 97 | CMC | 3 | 25 | 2.74 | 2.35 |
| Example 22 | 1.3 | 15 | 5 | 97 | METHYL ACRYLATE | 3 | 25 | 3.56 | 3.98 |
| Example 23 | 1.3 | 15 | 5 | 97 | PVDF | 3 | 25 | 3.33 | 4.12 |
| Example 24 | 1.22 | 15 | 5 | 97.5 | CMC | 2.5 | 25 | 24.37 | 1.54 |
| Example 25 | 1.3 | 15 | 5 | 98 | CMC | 2 | 25 | 8.82 | 0.45 |
| Example 26 | 1.3 | 15 | 5 | 99 | CMC | 1 | 25 | 15.3 | 0.15 |
| Example 27 | 1.3 | 15 | 5 | 99.5 | CMC | 0.5 | 25 | 31.4 | 0.06 |

Figure 4:
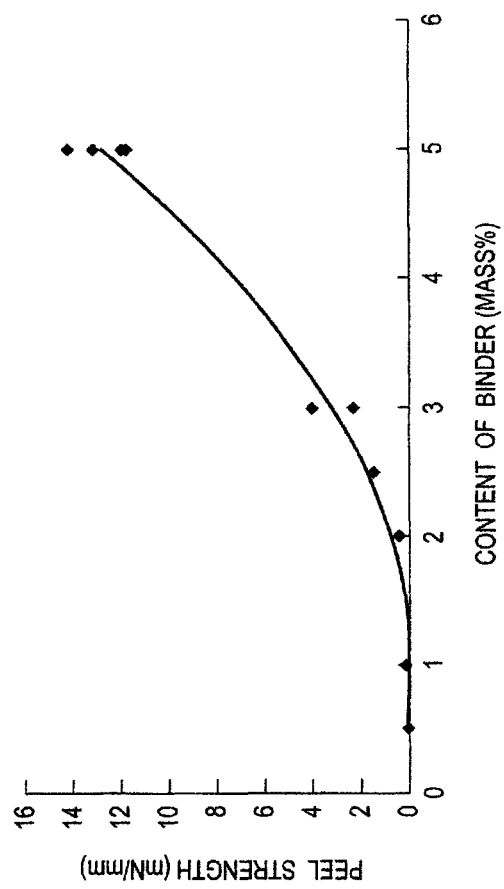
FIG. 4 is a graph showing the relationship between the content of a binder and peel strength in separators having a heat-resistant insulating layer of Examples 18 to 27.

As apparent from the results of Table 2 and the graph of FIG. 4 showing the relationship between the content of the binder and the peel strength, the peel strength increased in proportion to the increase in content of the binder. In other words, the peel strength can be properly adjusted by controlling the content of the binder, thus making the separator having a heat-resistant insulating layer resistant to vibration.

Figure 5:
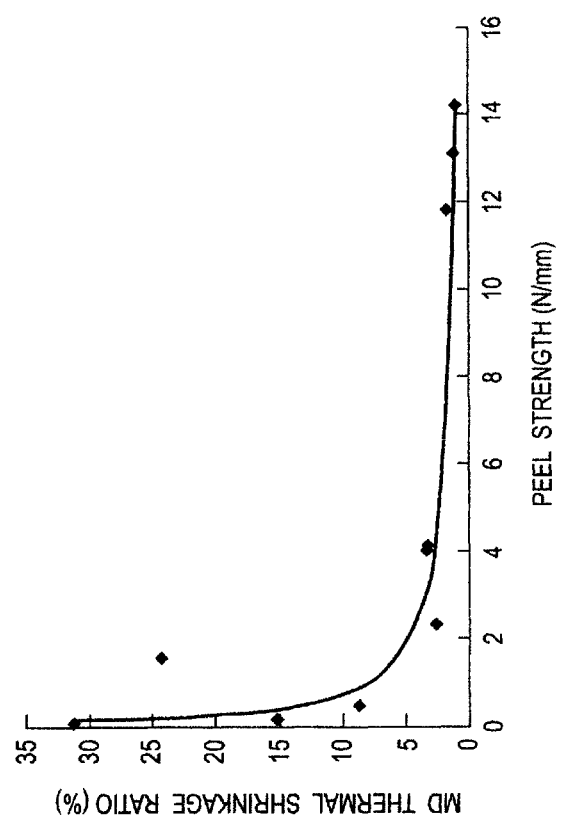
FIG. 5 is a graph showing the relationship between the peel strength and thermal shrinkage ratio in separators having a heat-resistant insulating layer of Examples 18 to 27.

As understood from the results of Table 2 and the graph of FIG. 5 showing the relationship between peel strength and MD thermal shrinkage ratio, the thermal shrinkage ratio lowered as the peel strength increased. The reason thereof is considered to be because, by increasing the peel strength, the stress reducing operation of the heat-resistant insulating layer can be effectively transmitted to the porous resin base layer, further reducing the thermal shrinkage of the separator.

The entire contents of Japanese Patent Application No. 2011-143348 (filed on Jun. 28, 2011) are incorporated by reference.

Hereinabove, the contents of the present invention are described along Examples. However, the present invention is not limited to the description thereof, and it is obvious to those skilled in the art that various modifications and improvements can be made.

For example, the present invention can be not only applied to the aforementioned laminate-type batteries but also applied to button batteries and canned batteries. Moreover, the present invention can be applied to not only the aforementioned laminate-type (flat) batteries but also winding-type (cylindrical) batteries. In terms of the electrical connection within lithium ion secondary batteries, the present invention can be applied to parallel internal connection type batteries described above but also serial internal connection type batteries such as bipolar batteries. The battery element of a general bipolar battery has a structure in which bipolar electrodes and electrolyte layers are stacked on one another, each bipolar electrode including a anode active material layer formed on one surface of a current collector and a cathode active material layer formed on the other surface thereof.

INDUSTRIAL APPLICABILITY

According to the present invention, it is possible to provide a safe separator which exhibits excellent thermal shrinkage resistance while ensuring the shutdown function.

REFERENCE SIGNS LIST

1 SEPARATOR HAVING A HEAT-RESISTANT INSULATING LAYER
3 POROUS RESIN BASE LAYER
5a, 5b HEAT-RESISTANT INSULATING LAYER
7a, 7b INORGANIC PARTICLE
9a, 9b BINDER
10 LITHIUM ION SECONDARY BATTERY
11 ANODE CURRENT COLLECTOR
11A OUTERMOST ANODE CURRENT COLLECTOR
12 ANODE ACTIVE MATERIAL LAYER
13 ELECTROLYTE LAYER
14 CATHODE CURRENT COLLECTOR
15 CATHODE ACTIVE MATERIAL LAYER
16 UNIT CELL LAYER
17 POWER GENERATING ELEMENT
18 ANODE CURRENT COLLECTOR PLATE
19 CATHODE CURRENT COLLECTOR PLATE
20 ANODE TERMINAL LEAD
21 CATHODE TERMINAL LEAD
22 LAMINATE FILM

The invention claimed is:

1. A separator having a heat-resistant insulating layer, comprising:
   a porous resin base layer; and
   a heat-resistant insulating layer which is provided on at least one side of the porous resin base layer and contains inorganic particles and a binder,
   wherein the porous resin base layer contains a resin having a melting temperature of 120° C. to 200° C.,
   a ratio of basis weight of the heat-resistant insulating layer to basis weight of the porous resin base layer is not less than 1.3, and
   a peel strength between the porous resin base layer and the heat-resistant insulating layer is 10 mN/mm or less.

2. The separator having a heat-resistant insulating layer according to claim 1, wherein the ratio of the basis weight of the heat-resistant insulating layer to the basis weight of the porous resin base layer is not more than 2.0.

3. The separator having a heat-resistant insulating layer according to claim 1, wherein peel strength between the porous resin base layer and the heat-resistant insulating layer is not less than 0.1 mN/mm.

4. The separator having a heat-resistant insulating layer according to claim 3, wherein the peel strength is not less than 2.0 mN/mm.

5. The separator having a heat-resistant insulating layer according to claim 1, wherein the inorganic particles include at least one selected from a group consisting of oxides, hydroxides, and nitrides of zirconium, aluminum, silicon, and titanium, and a mixture and a composite of the same.

6. The separator having a heat-resistant insulating layer according to claim 1, wherein the material constituting the porous resin base layer includes at least one selected from a group consisting of polyethylene, polypropylene, and ethylene-propylene copolymer.

7. The separator having a heat-resistant insulating layer according to claim 1, wherein the porous resin base layer includes at least one selected from a group consisting of woven fabric, non-woven fabric, and microporous membrane.

8. An electric device, comprising the separator having the heat-resistant insulating layer according to claim 1.

9. The separator having a heat-resistant insulating layer according to claim 2, wherein the inorganic particles include zirconia.

10. The separator having a heat-resistant insulating layer according to claim 1, wherein the inorganic particles include silica.

* * * * *